(12) United States Patent
Yanagawa

(10) Patent No.: US 6,577,581 B2
(45) Date of Patent: Jun. 10, 2003

(54) VARIABLE RECORDING LAYER DISK IMAGE PICKUP DEVICE

(75) Inventor: Naoharu Yanagawa, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/788,656

(22) Filed: Feb. 21, 2001

(65) Prior Publication Data

US 2001/0026522 A1 Oct. 4, 2001

(30) Foreign Application Priority Data

Feb. 21, 2000 (JP) ........................................ 2000-043256

(51) Int. Cl.[7] ................................................. G11B 3/74
(52) U.S. Cl. .................................... 369/94; 369/112.23
(58) Field of Search ............................. 369/53.2, 53.22, 369/112.01, 112.23, 94, 112.24

(56) References Cited

U.S. PATENT DOCUMENTS 5,867,468 A * 2/1999 Mori et al. ............... 369/44.23
5,872,761 A * 2/1999 Sugi et al. ................ 369/44.24

* cited by examiner

*Primary Examiner*—Paul W. Huber
(74) *Attorney, Agent, or Firm*—Sughrue Mion, PLLC

(57) ABSTRACT

An optical pickup device including an optical system which includes a first optical path which introduces a laser beam emitted from a light source to a recording surface of an optical disc through an objective lens and a second optical path which introduces the laser beam reflected on the recording surface of the optical disc to an optical detector through the objective lens, and an optical element which is disposed at least in the first optical path such that the optical element is movable in the optical axis direction of the laser beam.

5 Claims, 8 Drawing Sheets

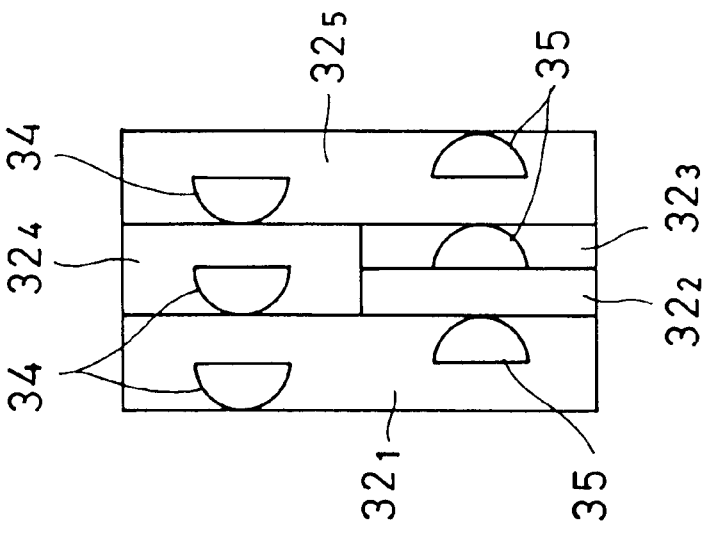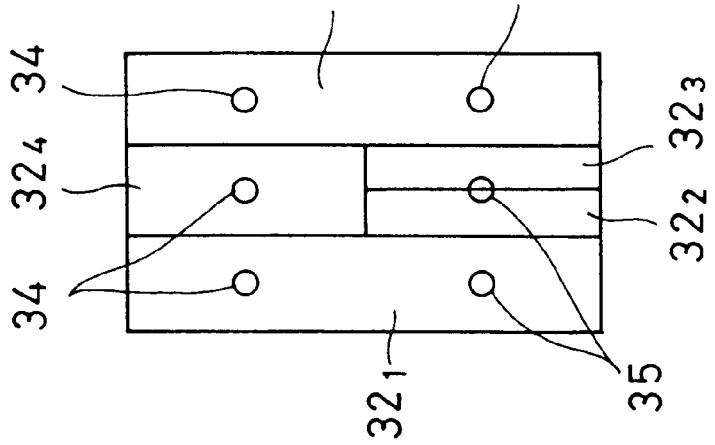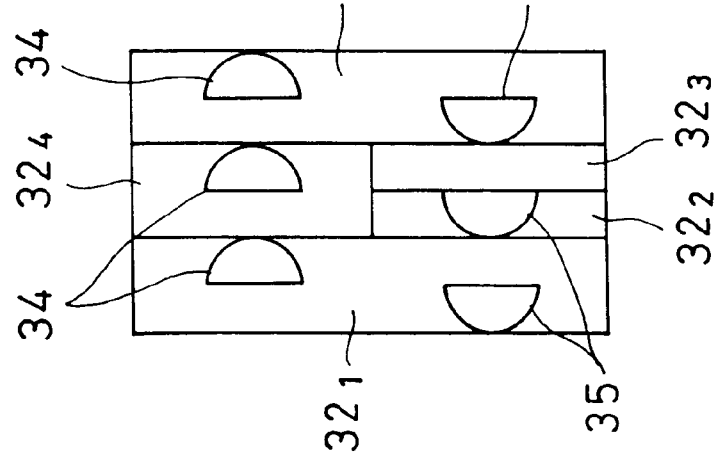

VARIABLE RECORDING LAYER DISK IMAGE PICKUP DEVICE

BACKGROUND OF THE INVENTION

1. Field of the Invention

The present invention relates to an optical pickup device which writes information data on an optical disc and reads written information data from an optical disc.

2. Description of the Related Background Art

In an optical disc which is used as an optical recording medium, a transparent layer having a predetermined thickness is formed on a recording surface of the optical disc so as to cover and protect the recording surface. In an optical information recording and reproducing apparatus, by emitting a reading beam light or a recording beam light to the recording surface through the transparent layer of the optical disc, the reading and recording of information data for the optical disc is performed.

However, in manufacturing many optical discs, it is difficult to fix the thickness of the transparent layers to a prescribed value and hence, a thickness error of several tens of $\mu$m is usually generated for each of the discs. Further, as for a DVD (Digital Versatile Disc) which has a plurality of recording layers in a single disc, for example, there is a transparent layer between a surface of the disc, to which a laser beam is applied, and a recording layer, and there is another transparent layer between the one recording layer and another recording layer. Thus, the distances from the surface to the respective recording layers differ from each other (see Japanese Laid-open Patent Publication 16214/1999).

Accordingly, there is a problem that since the difference in thickness of the transparent layer portion for the respective recording layers exists, a spherical aberration is not generated at a constant level as shown in FIG. 1 and hence, the information recording accuracy and the information reading accuracy are deteriorated.

SUMMARY OF THE INVENTION

It is therefore an object of the present invention to provide an optical pickup device which can overcome the problem and can accurately perform writing and reading of information to/from an optical disc by compensating for the spherical aberration.

The optical pickup device according to the present invention comprises an optical system which includes a first optical path which introduces a laser beam emitted from a light source to a recording surface of an optical disc through an objective lens and a second optical path which introduces the laser beam reflected on the recording surface of the optical disc to an optical detector through the objective lens, and an optical element which is disposed at least in the first optical path such that the optical element is movable in an optical axis direction of the laser beam.

BRIEF DESCRIPTION OF THE DRAWINGS

FIG. 6A–FIG. 6C are views showing the shape of an optical detector and optical spots.

DETAILED DESCRIPTION OF THE PREFERRED EMBODIMENT

Embodiments of the present invention will now be described in detail hereinafter with reference to the accompanying drawings.

Figure 1:
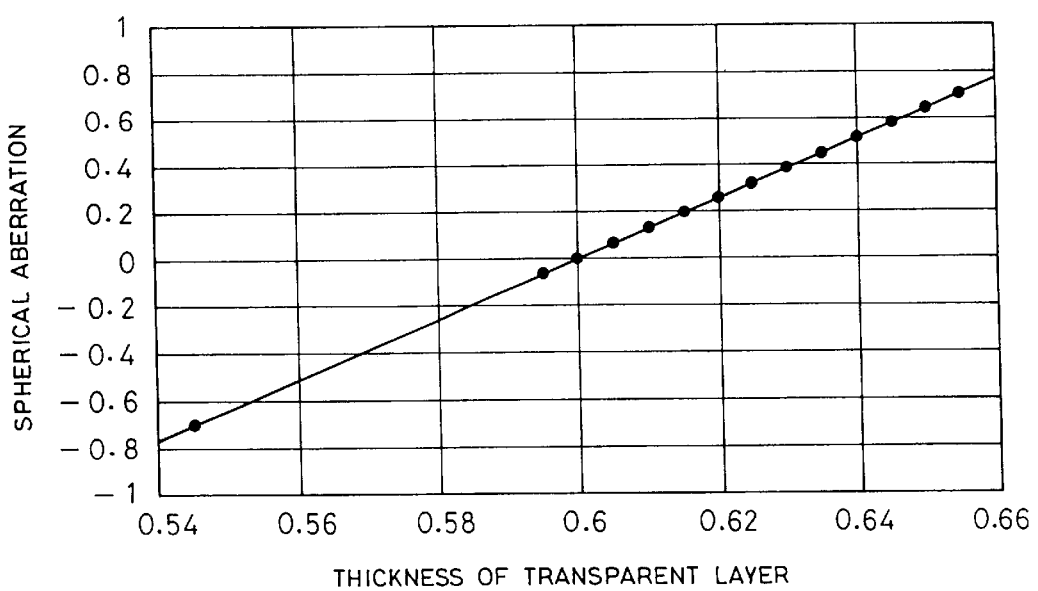
FIG. 1 is a graph showing the relationship between a transparent layer thickness of an optical disc and a spherical aberration.
Figure 2:
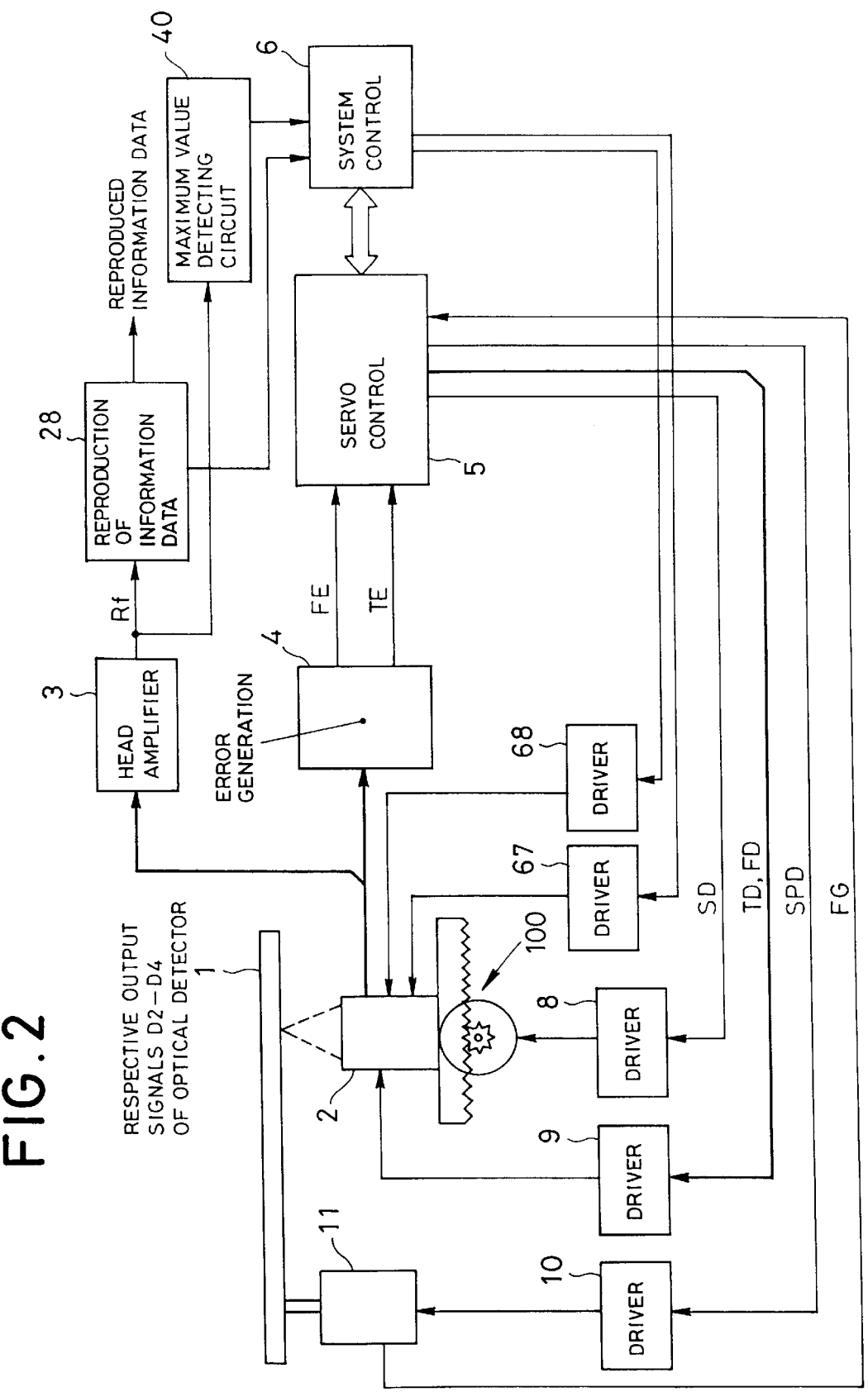
FIG. 2 is a block diagram schematically showing the constitution of an optical disc player to which an optical pickup device of the present invention is applied.

FIG. 2 is a view showing the schematic constitution of an optical disc player to which the present invention is applied.

Figure 3:
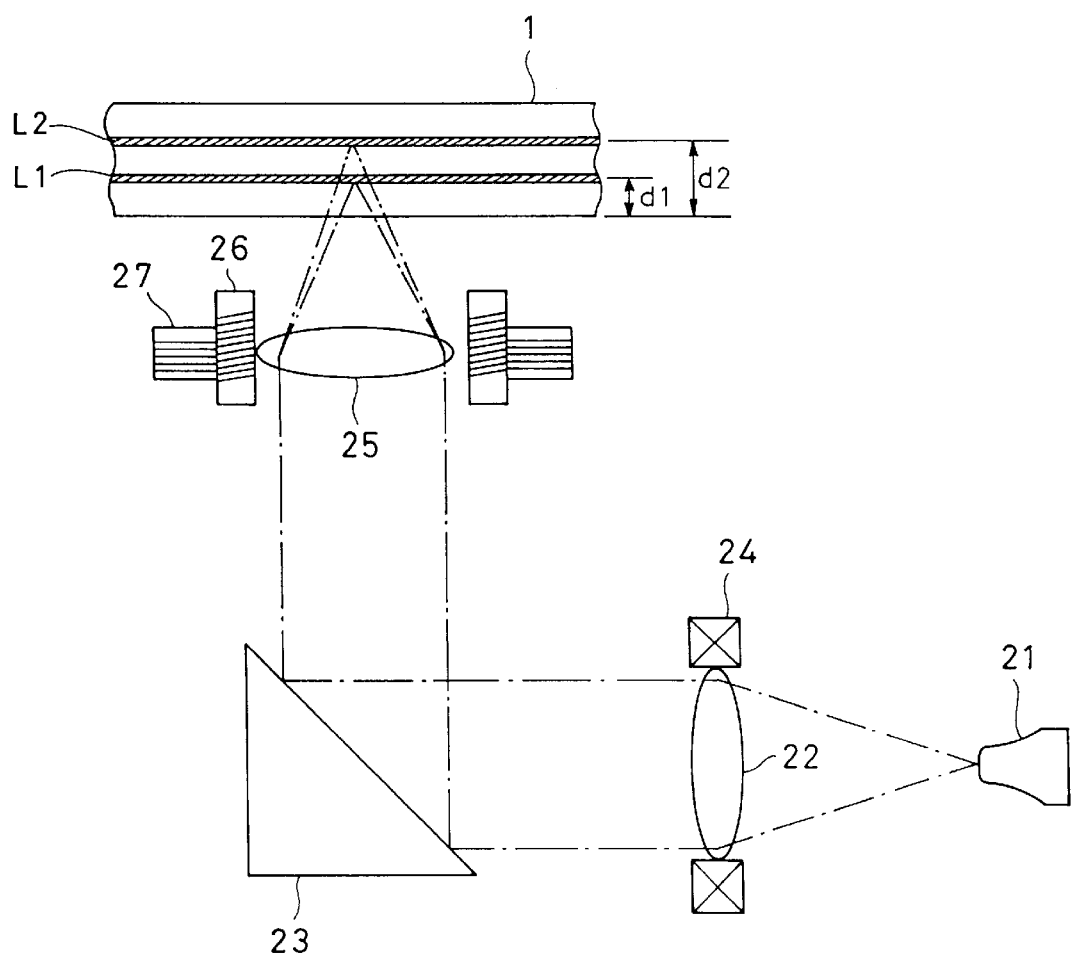
FIG. 3 is a view showing an optical system of the pickup device of FIG. 2.

In the optical disc player shown in FIG. 2, an optical disc 1 to be played is an optical recording medium such as a DVD having two recording layers. As shown in FIG. 3, one recording layer L1 has a transparent layer thickness d1 from an incident surface of laser beam light and the other recording layer L2 has a transparent layer thickness d2 from the incident surface of laser beam light. On the recording layers L1 and L2 of the optical disc 1, pit trains which carry information data (sound data, image data and computer data) along the helical or concentric recording medium tracks are formed. The information data recorded as the pit trains in the optical disc 1 are optically read by the pickup device 2.

Figure 4:
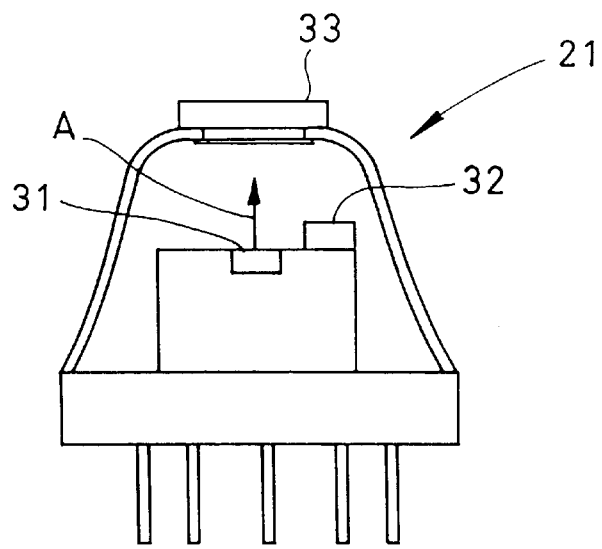
FIG. 4 is a view showing a cross section of a hologram laser element.
Figure 5:
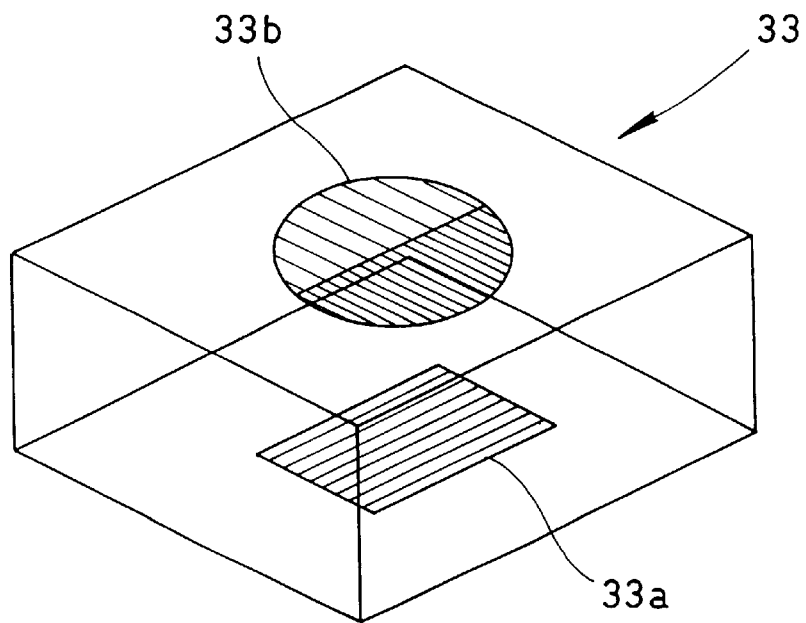
FIG. 5 is an outer appearance view showing a hologram laser element.

As shown in FIG. 3, the pickup device 2 includes a hologram laser element 21. The hologram laser element 21 is known and includes a semiconductor laser chip 31 emitting laser beams shown in an arrow direction A in FIG. 4, an optical detector 32 generating an output signal of a level corresponding to an amount of received light, and one hologram 33 constituting a so-called grating element. These are formed as a package. The hologram 33 is made of a sheet of glass plate. As shown in FIG. 5, the hologram 33 is provided with a diffraction grating 33a for generating a tracking beam, on a semiconductor laser chip side thereof. The diffraction grating 33a divides the emitted laser beams into a main beam for reading information and two sub beams for tracking. On the opposite side of the semiconductor laser chip side of the hologram 33, a refraction grating 33b for refracting an optical path, which introduces the laser beams reflected on the disc 1 to a light reception surface of the optical detector, is formed in a circular shape. The refraction grating 33b has a pattern divided into two semicircular portions which are different from each other. That is, the pattern of one semicircular portion and the pattern of the other semicircular portion are formed so as to have refraction angles which are different from each other.

The semiconductor laser chip 31 constitutes a light source and generates a laser beam when driven by a driver 67 (see FIG. 2). The laser beam is output from the hologram laser element 21 as the above main and sub laser beams through the hologram 33. Further, the reflected laser beams supplied to the hologram laser element 21 from the outside are designed to be guided to the light reception surface of the optical detector 32 through the hologram 33.

As shown in FIG. 3, the laser beams (indicated by a chain line in FIG. 3) emitted from the hologram laser element 21 reaches a mirror 23 through a collimator lens 22. The collimator lens 22 is arranged such that it is movable in the optical axis direction. That is, the collimator lens 22 is designed to be moved in the optical axis direction by driving an actuator 24. A driver 68 (see FIG. 2) is connected to the actuator 24 with piezo-electric elements. Further, in accordance with the moved position of the collimator lens 22, the collimator lens 22 converts the laser beams from the hologram laser element 21 into beams which are slightly diverged or relatively converged to a parallel light and supplies such beams to the mirror 23. The mirror 23 reflects the laser beams at an angle of approximately 90 degrees to the incidence of the laser beams. The direction of the reflected laser beams is the direction toward the optical disc 1. An objective lens 25 is arranged between the mirror 23 and the optical disc 1. The objective lens 25 is provided for converging the laser beams made of the parallel light onto recording surfaces of the respective recording layers L1 or L2 of the disc 1. Thus, the objective lens 25 is arranged such that it is movable in the optical axis direction as well as in the disc radial direction which is perpendicular to the optical axis direction. That is, the objective lens 25 is designed such that it is moved in the optical axis direction by a focusing actuator 26 and in the disc radial direction by a tracking actuator 27.

The laser beams reflected on the recording surfaces of the disc 1 pass through the objective lens 25 and are reflected approximately at an angle of 90 degrees by the mirror 23. The laser beams reflected by the mirror 23 reach the light reception surface of the optical detector 32 inside of the hologram laser element 21 through the collimator lens 22.

As shown in FIGS. 6A–6C, the optical detector 32 includes five split-light reception surfaces $32_1$–$32_5$ and generates an output signal D1–D5 for each light reception surfaces $32_1$–$32_5$. One pattern of the above-mentioned refraction grating of the hologram 33 forms three beam spots 34 on a light reception region made of the light reception surface $32_4$ and the halves of the respective light reception surfaces $32_1$ and $32_5$ which are disposed adjacent to the light reception surface $32_4$. The other pattern of the optical path refraction grating of the hologram 33 forms three beam spots 35 on a light reception region made of the reception surface $32_2$, $32_3$, the half of the light reception surface $32_1$ which is adjacent to the light reception surfaces $32_2$ and the half of the light reception surfaces $32_5$ which is adjacent to the light reception surface $32_3$. FIG. 6A shows the beam spots 34, 35 when the objective lens 25 is positioned too away from the disc 1, FIG. 6B shows the beam spots 34, 35 when the objective lens 25 is positioned at a focusing point, and FIG. 6C shows the beam spots 34, 35 when the objective lens 25 is positioned too close to the disc 1.

As shown in FIG. 2, respective output signals D2–D4 of the optical detector 32 are supplied to a head amplifier 3 and an error generation circuit 4. The head amplifier 3 obtains a RF signal (D2+D3+D4) by adding respective output signals D2–D4 of the optical detector 32 and amplifies and supplies these signals to an information data reproducing circuit 28 as the RF signal Rf.

The information data reproducing circuit 28, after converting the output RF signal Rf of the head amplifier 3 into a binary value, performs the modulation and the error correction processing so as to restore data recorded in the optical disc 1. Further, the information data reproducing device 28 performs reproduction of the information data by decoding the restored data and then outputs them as the reproduced information data (images, sounds, computer data).

Figure 7:
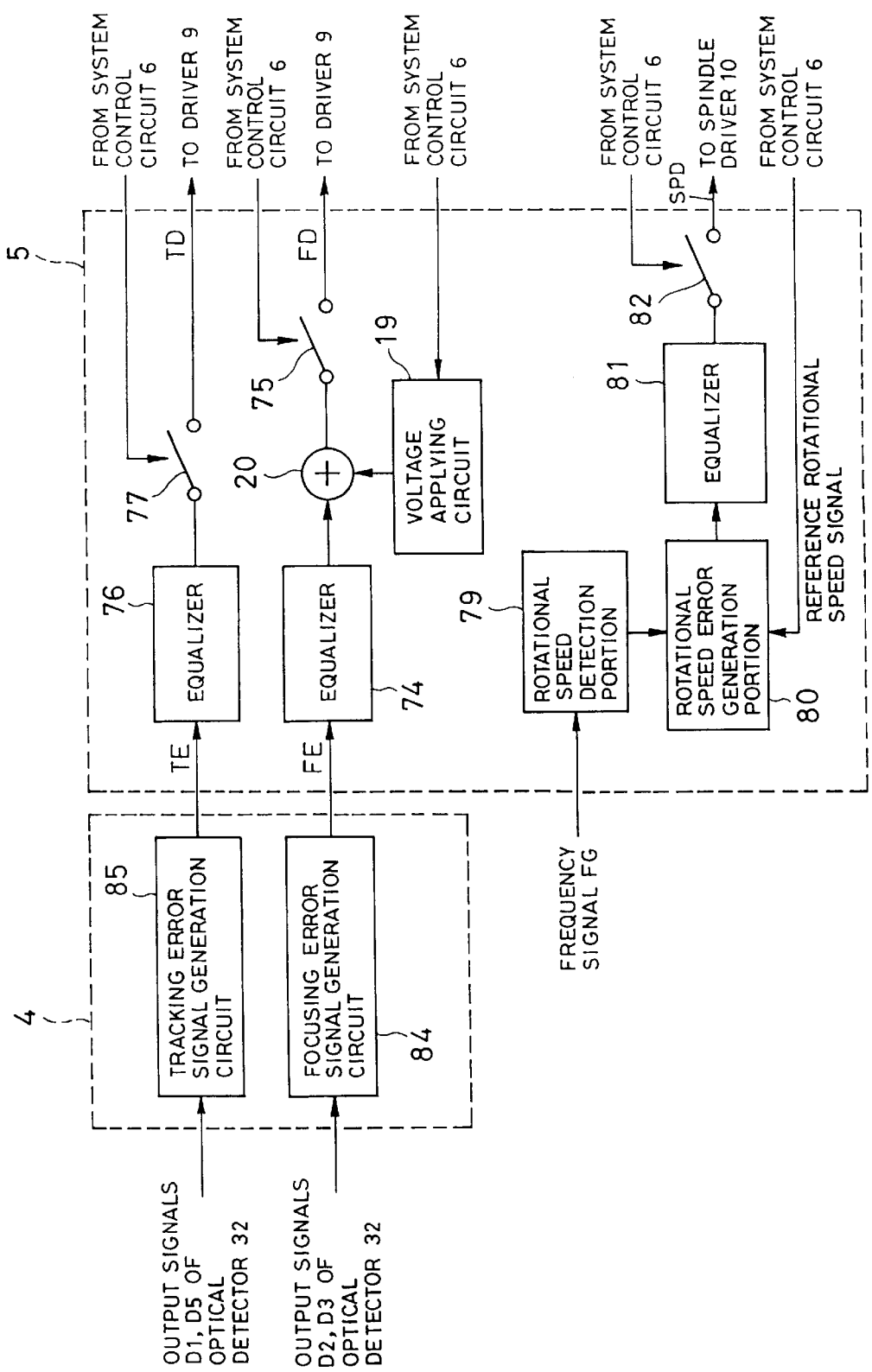
FIG. 7 is a view showing the respective inner constitutions of an error generation circuit and a servo control circuit of the player shown in FIG. 2.

As shown in FIG. 7, the error generation circuit 4 includes a focus error signal generating circuit 84 and a tracking error signal generating circuit 85. The focus error signal generating circuit 84 generates a focus error signal FE indicative of a focal error of a beam spot formed by the main laser beam on the recording surface of the optical disc 1 in accordance with the respective output signals D2, D3 of the optical detector 32. The focus error signal FE is expressed as FE=D2−D3. The tracking error signal generating circuit 85 generates a tracking error signal TE indicative of an error of the beam spot formed on the optical disc 1 in the disc radial direction from the center of the track in accordance with the respective output signals D1, D5 of the optical detector 32. The tracking error signal TE is expressed as TE=D1−D5. These error signals are supplied to a servo control circuit 5.

As shown in FIG. 7, in the servo control circuit 5, a frequency signal FG which is an alternating current signal indicative of current rotational speed of a spindle motor 11, which rotates the optical disc 1 as well as a turn table, is supplied to a rotational speed detection portion 79. The rotational speed detection portion 79 generates a rotational speed signal indicative of the spindle rotational number corresponding to the frequency signal FG and this rotational speed signal is supplied to a rotational speed error generating portion 80. The rotational speed error generating portion 80 generates a rotational speed error signal indicative of the difference between the rotational speed signal and the reference rotational speed signal supplied from a system control circuit 6 and supplies the rotational speed error signal to an equalizer 81. In accordance with the rotational speed error signal, the equalizer 81 generates a spindle drive signal SPD. The spindle drive signal SPD is supplied to the spindle motor 11 through the driver 10 when a switch 82 is turned on. The spindle motor 11 rotatably drives the optical disc 1 at a rotational speed corresponding to the spindle drive signal SPD. An alternating current generator (not shown in the drawing) mounted on the spindle motor 11 supplies the above-mentioned frequency signal FG corresponding to real-time or current rotational speed to the servo control circuit 5. In a spindle servo system having the constitution, the spindle motor 11 is rotatably driven at the rotational speed indicated by a reference rotational speed signal supplied from the system control circuit 6.

Further, in the servo control circuit 5, the above-mentioned focus error signal FE is supplied to an equalizer 74 which generates a focusing drive signal FD. The focusing drive signal FD is supplied to the driver 9 through an adder 20 when a switch 75 is turned on. In accordance with the focusing drive signal FD, the driver 9 drives the focusing actuator 26 mounted on the pickup device 2 and the focusing actuator 26 is operated such that the focal position of the beam spots emitted to the disc 1 can be adjusted. A voltage applying circuit 19 is connected to the adder 20. In response to a focus jump command supplied from the system control circuit 6, the voltage applying circuit 19 generates a fixed voltage. That is, the system control circuit 6 generates the focus jump command at the time of reproducing the recording layer L2 of the disc 1 and in response to the focus jump command and the fixed voltage is generated by the voltage applying circuit 19. Then, this fixed voltage is added to the output signal of the equalizer 74 by the adder 20 and this output signal of the equalizer 20 becomes the focusing drive signal FD. At the time of reproducing the recording layer L1 of the disc 1, since the system control circuit 6 does not generate the focus jump command, the output signal of the equalizer 74 directly becomes the focusing drive signal FD.

Further, in the servo control circuit 5, the above-mentioned tracking error signal TE is supplied to an equalizer 76 so as to make the equalizer 76 generate a tracking drive signal TD and the tracking drive signal TD is supplied to a driver 9 when a switch 77 is turned on. The driver 9 drives a tracking actuator 27 mounted on the pickup device 2 in accordance with the tracking drive signal TD and the tracking actuator 27 shifts the position of the beam spots emitted to the disc 1 in the radial direction of the disc 1 by an amount corresponding to a drive current issued by the above-mentioned tracking drive signal TD.

The above-mentioned switches 75, 77, 82 are respectively turned on or off in response to commands from the system control circuit 6. The switch 75 is turned on at the time of focus servo control, the switch 77 is turned on at the time of the tracking servo control and the switch 82 is turned on at the time of the spindle servo control.

Further, although not shown in FIG. 7, the servo control circuit 5 generates a slider drive signal SD in accordance with the above-mentioned tracking error signal TE and supplies this slider drive signal SD to a slider 100 through the driver 8 (see FIG. 2). In the constitution, the slider 100 moves the pickup device 2 in the radial direction of the disc 1 at a rotational speed in accordance with a drive current issued by the slider drive signal SD.

As shown in FIG. 2, a driver 67 which drives the semiconductor laser chip 31 and the driver 68 which drives the actuator 24 are connected to the system control circuit 6. The system control circuit 6 performs control of drive operations by the respective drivers 67, 68.

The system control circuit 6 is comprised of a microcomputer and performs control of the whole disc player. Upon receiving a manipulation input from a manipulation portion (not shown in the drawing) by a user and a current operating status of the disc player, the system control circuit 6 generates various kinds of control signals. The servo control circuit 5 performs servo control operations corresponding to the respective control signals generated by the system control circuit 6.

Figure 8:
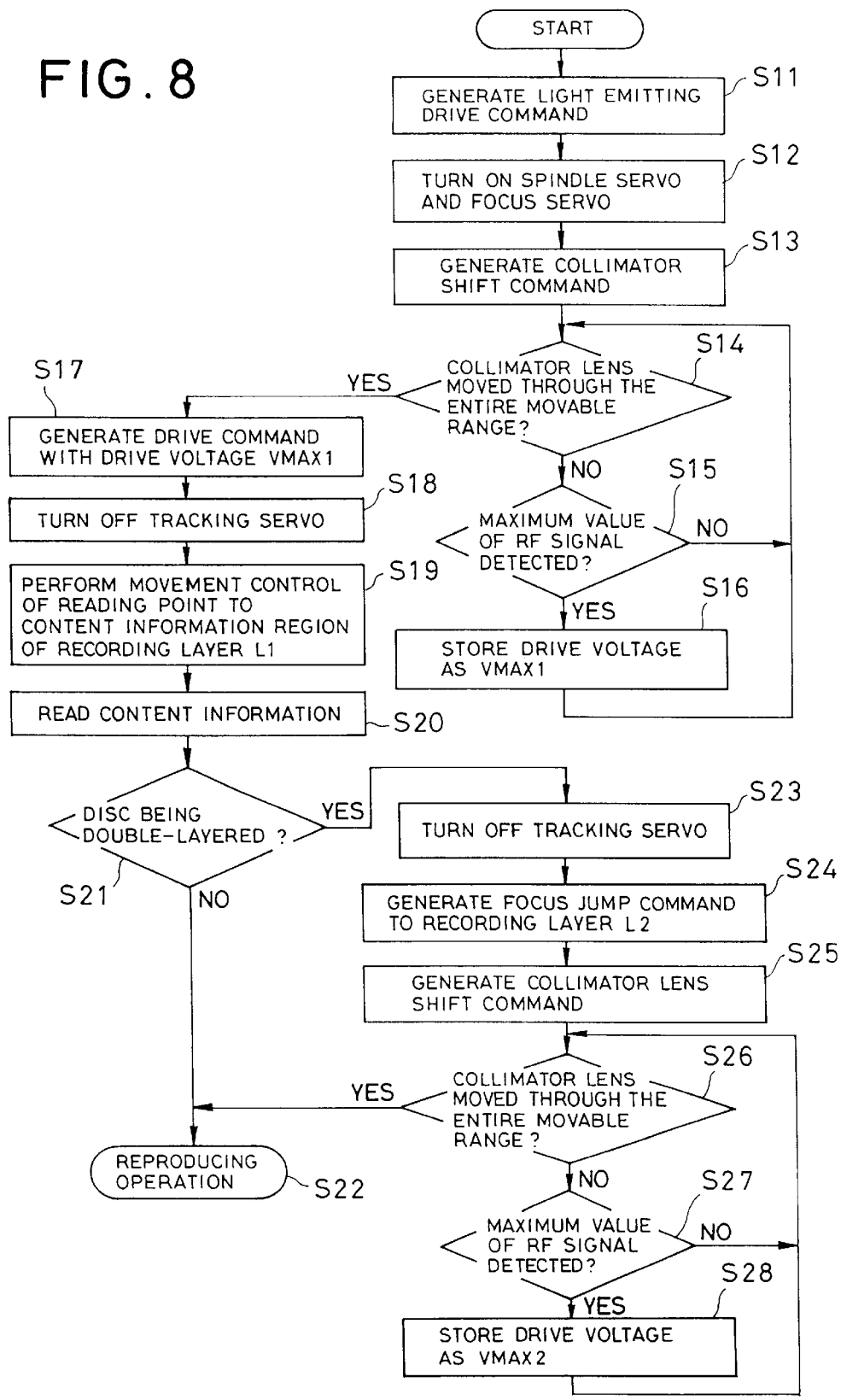
FIG. 8 is a flow chart showing the operation of a system control circuit shown in FIG. 2.

When the disc 1 is set on the turn table, the system control circuit 6, as shown in FIG. 8, first, generates a light emitting drive command for the driver 67 (step S11). In response to the light emitting drive command, the driver 67 supplies a drive current to the semiconductor laser chip 31 and hence, a laser beam is emitted from a light emitting point of the semiconductor laser chip 31.

After executing the step S11, the system control circuit 6 turns on the spindle servo and further turns on the focus servo (step S12). That is, the switches 82 and 75 are turned on. When the focus servo control and the spindle servo control are performed, the disc 1 is rotatably driven and the focal point of the beam spot formed by the main laser beam on the recording surface of the recording layer L1 of the disc 1 is adjusted. Since the voltage is not applied to the adder 20 from the voltage applying circuit 19 in the focus servo system, the output signal of the equalizer 74 directly passes through the adder 20 and thereafter is supplied to the driver 9 through the switch 75. Thus, the focal point of the beam spot is adjusted on the recording surface of the recording layer L1 of the disc 1.

Further, the system control circuit 6 generates a collimator lens shift command for the driver 68 (step S13). In response to the collimator lens shift command, the driver 68 supplies a drive voltage, which is gradually changed, to the actuator 24 with the piezo-electric elements. Therefore, the collimator lens 22 is driven and is moved in the optical axis direction within a movable range.

The system control circuit 6, after executing the step S13, judges whether the collimator lens 22 has completed movement of the entire movable range of the collimator lens 22 or not (step S14). If the collimator lens 22 has not yet completed movement of the entire movable range, the system control circuit 6 monitors the maximum value of the RF signal Rf detected by a maximum value detection circuit 40 (see FIG. 2) and judges whether the maximum value of the RF signal Rf is detected or not (step S15). If the maximum value is detected, the drive voltage generated by the driver 68 at the time of acquiring the maximum value is set as VMAX1 and is stored in a memory not shown in the drawing (step S16). Then, returning to the step S14, the system control circuit 6 continues the movement of the collimator lens 22. On the other hand, in the step S14, if the system control circuit 6 judges that the collimator lens 22 has completed its movement through the entire movable range, the system control circuit 6 commands the driver 68 to perform driving with the drive voltage VMAX1 (step S17). The drive voltage VMAX1 stored at the time becomes the maximum value of the actual RF signal Rf within the entire range of the collimator lens 22 with respect to the recording layer L1. The position of the collimator lens 22 where the drive voltage becomes the maximum value VMAX1 is a position where a spherical aberration caused by the difference in thickness of the transparent layer portion for the respective recording layers L1 and L2 in the multi-layered disc 1 can be most suppressed. That is, by adjusting the position of the collimator lens 22 at the position where the spherical aberration having the inverse characteristics to the spherical aberration caused by the thickness difference for the transparent layer portion is generated, the spherical aberrations can be offset each other.

After executing the step S17, the system control circuit 6 turns on the tracking servo (step S18). That is, the switch 76 is turned on. In the tracking servo control, the tracking error signal output form the above-mentioned tracking error signal generating circuit 85 becomes the tracking drive signal TD through the equalizer 76 and the tracking drive signal TD is supplied to the driver 9 through the switch 76 so that the tracking actuator 27 is driven. Therefore, the system control circuit 6 performs the control such that the beam spot corresponding to the main laser beam is positioned on the on-track of the recording layer L1.

The system control circuit 6 performs movement control of the reading point of the pickup device 2 in the content information region (TOC region) of the recording layer L1 (step S 19) so as to obtain content information related with the disc 1 (step S20). The movement control of the pickup device 2 is performed by the control of the tracking servo and the focus servo including the movement of the slider 100. The content information includes multi-layered recording information which indicates whether the disc 1 is a single-layered recording disc or a double-layered recording disc. The system control circuit 6 obtains the content information from a content information reproducing circuit in the information data reproducing circuit 28.

After executing the step S20, the system control circuit 6 judges whether the disc 1 is a double-layered recording disc or not based on the content information (step S21). When it is judged that the disc 1 is not a double-layered recording disc, but a single-layered recording disc, the flow advances to a reproducing operation (step S22).

On the other hand, if it is judged that the disc 1 is a double-layered recording disc, the system control circuit 6 turns off the tracking servo (step S23) and generates the focus jump command for the recording layer L2 of the disc 1 (step S24). In response to the focus jump command, a fixed voltage is generated by the voltage applying circuit 19 and the fixed voltage is added to the output signal of the equalizer 74 by means of the adder 20 so that the output signal of the adder 20 becomes the focusing drive signal FD. In accordance with the focusing drive signal FD, the driver 9 drives the objective lens 25 through of the focusing actuator 27. Accordingly, the focal point of the beam spot on the recording surface of the recording layer L2 of the disc 1 by the laser beams can be adjusted.

After executing the step S24, the system control circuit 6 generates the collimator lens shift command for the driver 68 (step S25). In response to this collimator lens shift command, the driver 68 applies the drive voltage which changes gradually to the actuator 24 with the piezo electric elements. Accordingly, the collimator lens 22 is driven and is moved in the optical axis direction within the movable range.

The system control circuit 6, after executing the step S25, judges whether the collimator lens 22 has completed its movement through the entire movable range of the collimator lens 22 or not (step S26). If the collimator lens 22 has not yet completed the movement through the entire movable range of the collimator lens 22, the system control circuit 6 monitors the maximum value of the RF signal Rf detected by the maximum value detection circuit 40 and judges whether the maximum value of the RF signal Rf is detected or not (step S27). If the maximum value is detected, the drive voltage generated by the driver 68 at the time of acquiring the maximum value is set as VMAX2 and is stored in the memory not shown in the drawing (step S28). Then, returning to the step S26, the system control circuit 6 continues the movement of the collimator lens 22. On the other hand, in the step S26, if the system control circuit 6 judges that the collimator lens 22 has completed the movement through the entire movable range of the collimator lens 22, the drive voltage VMAX2 stored at this point of time becomes the maximum value of the actual RF signal Rf within the entire movable range of the collimator lens 22 with respect to the recording layer L2. The position of the collimator lens 22 where the drive voltage becomes the maximum value VMAX2 is a position where the spherical aberration caused by the difference in thickness of the transparent layer portion of the multi-layered disc can be substantially suppressed. That is, by adjusting the position of the collimator lens 22 at the position where the spherical aberration having the inverse characteristics to the spherical aberration caused by the thickness difference for the transparent layer portion is generated, the spherical aberrations can offset each other.

Therefore, if the system control circuit 6 judges that the collimator lens 22 has completed the movement through the entire movable range of the collimator lens 22, this implies that the proper position of the collimator lens 22 is detected and hence, the processing advances to the reproducing operation (step S22). In the reproducing operation, by the manipulation of the user or automatically, the drive voltage VMAX1 or VMAX2 which is stored in the memory corresponding to the selected recording layer is applied to the actuator 24 by the driver 68. That is, when the reproducing of the recording layer L1 of the disc 1 is selected, the drive voltage VMAX1 is applied to the actuator 24. When the reproducing of the recording layer L2 of the disc 1 is selected, the drive voltage VMAX2 is applied to the actuator 24. Accordingly, it is possible to move the collimator lens 22 to the position where the above-mentioned spherical aberration can be substantially suppressed for each recording layer to be reproduced.

The constitution for driving the collimator lens 22 in the above-mentioned embodiment is applicable to a pickup device which can perform the simultaneous reading of the recording layer L1 and the recording layer L2.

Figure 9:
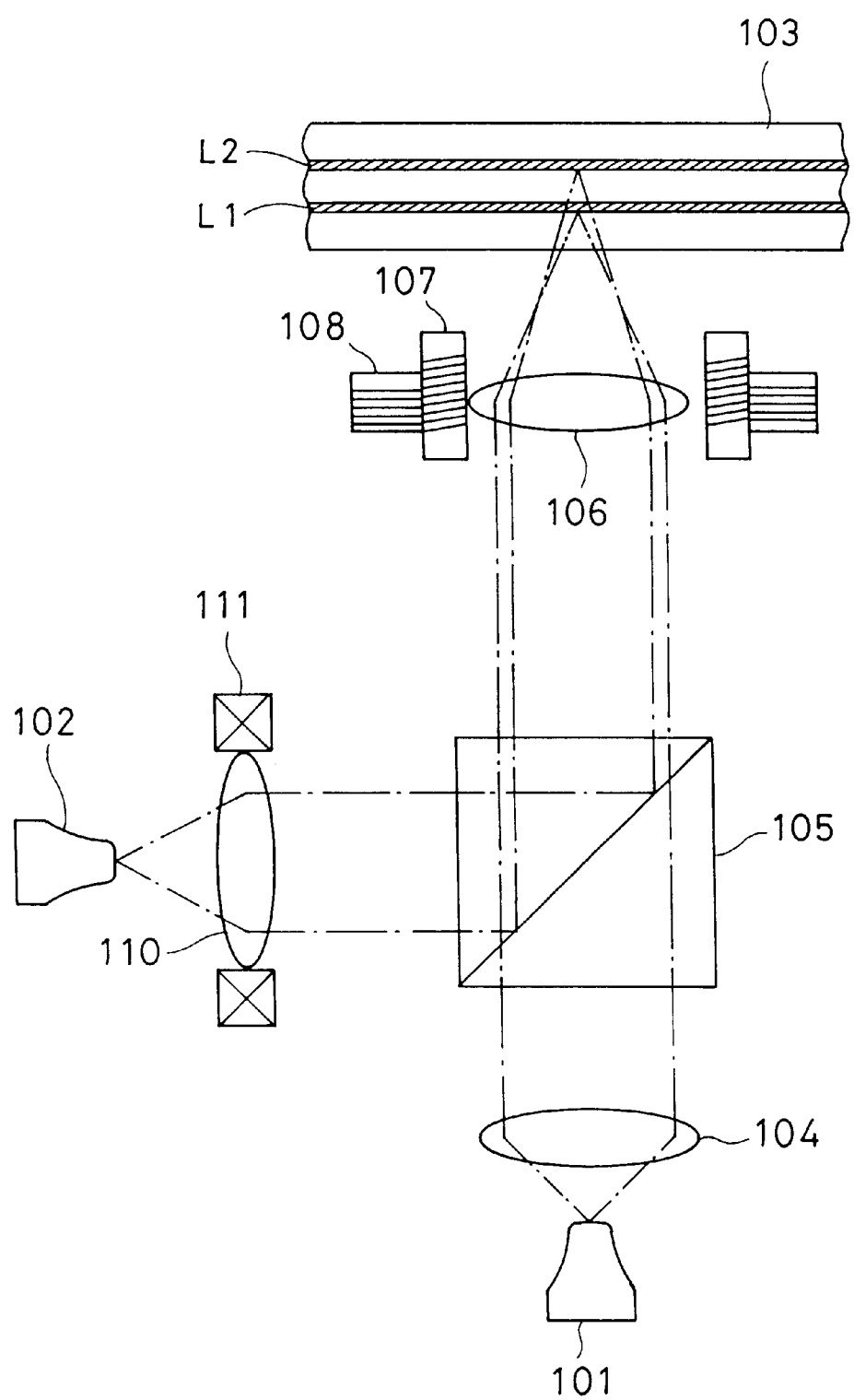
FIG. 9 is a view schematically showing an optical system of an optical pickup device as an application example of the present invention.

FIG. 9 shows an optical system of the pickup device which can perform the simultaneous reading. The pickup device is provided with two hologram laser elements 101, 102. One hologram laser element 101 is provided for reading a first recording layer L1 of an optical disc 103 and the other hologram laser element 102 is provided for reading a second recording layer L2 of the optical disc 103. The constitution of the hologram laser element 101, 102 is similar to that of the hologram laser element 21 shown in FIG. 3 and is comprised of a semiconductor laser chip and an optical detector and a hologram. A first laser beam (chain line of FIG. 9) emitted from the semiconductor laser chip inside of the hologram laser element 101 is irradiated to the outside of the hologram laser element 101 as main and sub laser beams through the hologram. The irradiated laser beams are formed into parallel beams by a collimator lens 104 and then directly and straightly pass through a mirror 105 and reach an objective lens 106. By the objective lens 106, the laser beams are converged onto a recording surface of the first recording layer L1 of the disc 103 and optical spots are formed on the recording surface. The first laser beams which are modulated by information pits on the recording surface and are reflected on the recording surface directly pass through the objective lens 106 and then straightly pass through the mirror 105. Thereafter, the first laser beams pass through the collimator lens 104 and return to the hologram inside of the hologram laser element 101. The first laser beams are separated from the optical path from the semiconductor laser chip and are incident on a light reception surface of the optical detector. The collimator lens 104 is fixedly secured. Further, the objective lens 106 is mounted such that the objective lens 106 is movable optical axis direction and in the radial direction of the optical disc perpendicular to the optical axis direction. That is, the objective lens 106 is moved in the optical axis direction driven by a focusing actuator 107 and in the radial direction of the disc driven by a tracking actuator 108.

On the other hand, the second laser beam (chain double-dashed line of FIG. 9) emitted from the semiconductor laser chip inside of the hologram laser element 102 is irradiated to the outside from the hologram laser element 102 as main and sub laser beams through the hologram. The irradiated second laser beams are formed into parallel beams by a collimator lens 110 and then are reflected on the mirror 105. The second laser beams reflected on the mirror 105 reach the objective lens 106. By the objective lens 106, the second laser beams are converged onto a recording surface of the second recording layer L2 of the disc 103 and optical spots are formed on the recording surface. The second laser beams which are modulated by information pits on the recording surface and are reflected on the recording surface of the second recording layer L2 are formed into parallel beams by the objective lens 106 and then are reflected on the mirror 105. Thereafter, the second laser beams pass through the collimator lens 110 and return to the hologram inside of the hologram laser element 102. The second laser beams are separated from the optical path from the semiconductor laser chip and are incident on a light reception surface of the optical detector. The collimator lens 110 is mounted such that it is movable in the optical axis direction. That is, the collimator lens 106 is moved in the optical axis direction driven by an actuator 111. In the case, the position of the collimator lens 110 can be adjusted such that an RF signal becomes maximum as in the case of the above-mentioned embodiment.

Although the occurrence of the spherical aberration is prevented by moving the collimator lens in the optical axis direction in the above-mentioned respective embodiments, the hologram laser element per se may be moved back and forth in the beam irradiating direction.

Further, although the case in which the information are read from the respective recording layers of the disc is explained in the above-mentioned respective embodiments, even when information is written in respective recording layers, the spherical aberration can be reduced in the same manner by adjusting the position of the collimator lens or the hologram laser element.

Further, although the above-mentioned respective embodiments are provided with the hologram laser element comprised of the semiconductor laser chip, the optical detector and the hologram, the semiconductor laser chip, the optical detector and the hologram may be employed individually. Alternately, the grating may be used in place of the hologram.

Still further, although the above-mentioned respective embodiments are provided with the double-layered optical disc as the optical disc, it is preferable to use a triple-layered optical disc. Further, it is needless to say that the present invention is applicable to a single-layered optical disc.

As has been described heretofore, according to the optical pickup device of the present invention, accurate writing and reading of information with respect to the optical disc can be performed by compensating for the spherical aberration.

What is claimed is:

1. An optical pickup device comprising:
    a first optical path which introduces a laser beam emitted from a light source to a recording surface of an optical disc through an objective lens;
    a second optical path which introduces the laser beam reflected on the recording surface of the optical disc to an optical detector through the objective lens;
    an optical element which is disposed at least in the first optical path such that said optical element is movable in an optical axis direction of the laser beam; and
    a driver for moving said optical element such that a spherical aberration can be reduced in an optical system having said first optical path and said second optical path, wherein said driver adjusts a position of said optical element such that an output signal level of said optical detector becomes a maximum value.

2. An optical pickup device according to claim 1, wherein said optical element is a collimator lens.

3. The optical pickup device according to claim 1, wherein a position of the optical element is dynamically fine-tuned to obtain a maximum value of an output signal level by said optical detector.

4. An optical pickup device comprising:
    a first optical path which introduces a laser beam emitted from a light source to a recording surface of an optical disc through an objective lens:
    a second optical path which introduces the laser beam reflected on the recording surface of the optical disc to an optical detector through the objective lens: and
    an optical element which is disposed at least in the first optical path such that said optical element is movable in an optical axis direction of the laser beam,
    wherein said optical element is a collimator lens,
    wherein said optical disc includes a plurality of recording layers, and the position of said collimator lens is adjusted in the optical axis direction of the laser beam for every reading from or writing to a recording surface of each of the plurality of recording layers, and
    wherein a second collimator lens is disposed between a second optical detector and said objective lens, said second collimator lens configured for at least one of reading from and writing to a recording surface of at least one of said plurality of recording layers.

5. The optical pickup device according to claim 4, wherein the position of said second collimator lens is not adjustable in the optical axis direction.

* * * * *